(12) United States Patent
Kerselaers et al.

(10) Patent No.: US 11,108,436 B1
(45) Date of Patent: Aug. 31, 2021

(54) NEAR-FIELD WIRELESS DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/883,400

(22) Filed: May 26, 2020

(51) Int. Cl.
H04B 5/02 (2006.01)
H04W 4/80 (2018.01)
H04B 5/00 (2006.01)

(52) U.S. Cl.
CPC ............. H04B 5/02 (2013.01); H04B 5/0081 (2013.01)

(58) Field of Classification Search
CPC ... H04B 1/04; H04B 1/38; H04B 1/40; H04B 5/00; H04B 5/02; H04B 5/0012; H04B 5/0043; H04B 5/0075; H04B 5/0081; H04W 4/80; H04W 12/47; G01V 3/10; G01V 3/105; G01V 3/107; A61M 2230/04; A61M 2230/06; A61M 2230/30; A61M 2230/50; A61M 2230/63
See application file for complete search history.

(56) References Cited

U.S. PATENT DOCUMENTS

| | | | | |
|---|---|---|---|---|
| 8,285,387 B2* | 10/2012 | Utsi | ................... | A61N 1/37223 607/60 |
| 9,125,007 B2* | 9/2015 | Konanur | .............. | H04B 5/0031 |
| 9,197,986 B1 | 11/2015 | Kerselaers et al. | | |
| 9,813,103 B2* | 11/2017 | Krogerus | ................. | H04B 1/40 |
| 9,819,075 B2 | 11/2017 | Kerselaers et al. | | |
| 9,819,097 B2 | 11/2017 | Kerselaers et al. | | |
| 10,015,604 B2 | 7/2018 | Kerselaers et al. | | |
| 10,491,270 B1* | 11/2019 | Kerselaers | ........... | H04B 5/0056 |
| 10,680,322 B2* | 6/2020 | Lee | .......................... | H04B 5/00 |
| 2015/0318603 A1 | 11/2015 | Kerselaers et al. | | |
| 2015/0319545 A1 | 11/2015 | Kerselaers et al. | | |
| 2017/0062949 A1 | 3/2017 | Kerselaers et al. | | |
| 2017/0272128 A1 | 9/2017 | Tanaka | | |
| 2017/0324170 A1 | 11/2017 | Kerselaers et al. | | |
| 2019/0296439 A1 | 9/2019 | Kerselaers et al. | | |
| 2019/0336778 A1* | 11/2019 | Sandhu | .............. | A61N 1/37229 |
| 2019/0363459 A1 | 11/2019 | Geens et al. | | |

(Continued)

OTHER PUBLICATIONS

U.S. Appl. No. 16/781,050; 36 pages (Feb. 4, 2020).

(Continued)

Primary Examiner — Quochien B Vuong

(57) ABSTRACT

One example discloses a near-field wireless device, including: a coil, including a first feed-point and a second feed-point, and configured to carry non-propagating quasi-static near-field magnetic-induction wireless signals; a conductive surface, including a third feed-point, and configured to carry non-propagating quasi-static near-field electric-induction wireless signals; a tuning circuit including a first tuning element, a second tuning element, and a mid-point; wherein a first end of the first tuning element is coupled to the first feed-point; wherein a first end of the second tuning element is coupled to the second feed-point; wherein a second end of the first tuning element and a second end of the second tuning element are coupled to the mid-point; and wherein the third feed-point is coupled to the mid-point.

20 Claims, 6 Drawing Sheets

(56) References Cited

U.S. PATENT DOCUMENTS

2020/0083962 A1    3/2020   Gomme et al.

OTHER PUBLICATIONS

Zimmerman. T. G.; Personal Area Networks: Near-field intrabody communication; IBM Systems Journal, vol. 35, Nos. 3 & 4; 9 pages (1996).

IEEE Computer Society; IEEE Standard for Local and metropolitan area networks—Part 15.6: Wireless Body Area Networks; 271 pages (Feb. 29, 2012).

\* cited by examiner

NEAR-FIELD WIRELESS DEVICE

The present specification relates to systems, methods, apparatuses, devices, articles of manufacture and instructions for near-field wireless devices.

SUMMARY

According to an example embodiment, a near-field wireless device, comprising: a coil, including a first feed-point and a second feed-point, and configured to carry non-propagating quasi-static near-field magnetic-induction wireless signals; a conductive surface, including a third feed-point, and configured to carry non-propagating quasi-static near-field electric-induction wireless signals; a tuning circuit including a first tuning element, a second tuning element, and a mid-point; wherein a first end of the first tuning element is coupled to the first feed-point; wherein a first end of the second tuning element is coupled to the second feed-point; wherein a second end of the first tuning element and a second end of the second tuning element are coupled to the mid-point; and wherein the third feed-point is coupled to the mid-point.

In another example embodiment, the mid-point is directly connected to a voltage reference.

In another example embodiment, the mid-point is directly connected to a ground plane.

In another example embodiment, the conductive surface is directly connected to a ground plane.

In another example embodiment, the conductive surface is directly connected to the mid-point.

In another example embodiment, further comprising a reference plane; wherein the mid-point is coupled to the reference plane; and wherein the reference plane is configured to increase an effective electrical size of the conductive surface responsive to the near-field electric-induction wireless signals.

In another example embodiment, either the first or second first tuning element is a capacitance tuning element.

In another example embodiment, either the first or second first tuning element is a resistive tuning element.

In another example embodiment, the conductive surface is configured to be placed within a first distance from the coil and a second distance from a user's body.

In another example embodiment, the second distance is greater than the first distance.

In another example embodiment, the conductive surface is a first conductive surface; the coil is configured as a second conductive surface; and the first and second conductive surfaces are configured to carry the near-field electric-induction wireless signals.

In another example embodiment, the conductive surface is a first conductive surface; further comprising a second conductive surface coupled to either the first feed-point or the second feed-point; and wherein the first and second conductive surfaces are configured to carry the near-field electric-induction wireless signals.

In another example embodiment, the coil includes a planar coil having a spiral wound wire.

In another example embodiment, the coil includes a core having a helically wound wire around the core.

In another example embodiment, the conductive surface is configured for on-body near-field communications.

In another example embodiment, the first and second tuning elements are resistive elements, configured to vary a bandwidth of the wireless device.

In another example embodiment, the first and second tuning elements are capacitive elements, configured to vary a resonant frequency of the wireless device.

In another example embodiment, the electric-induction near-field signals are hosted by a user's body; and the user's body is at least one of: a human body, a vehicle body, a robot, a docking device, a physical coupling system, or a tool or storage station on an assembly line.

In another example embodiment, the wireless device is embedded in at least one of: a wearable, a glucose monitor, a medical device, a smart watch, an earbud, a hearing aid, a headphone, an activity tracker, or a heart rate monitor.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1A:
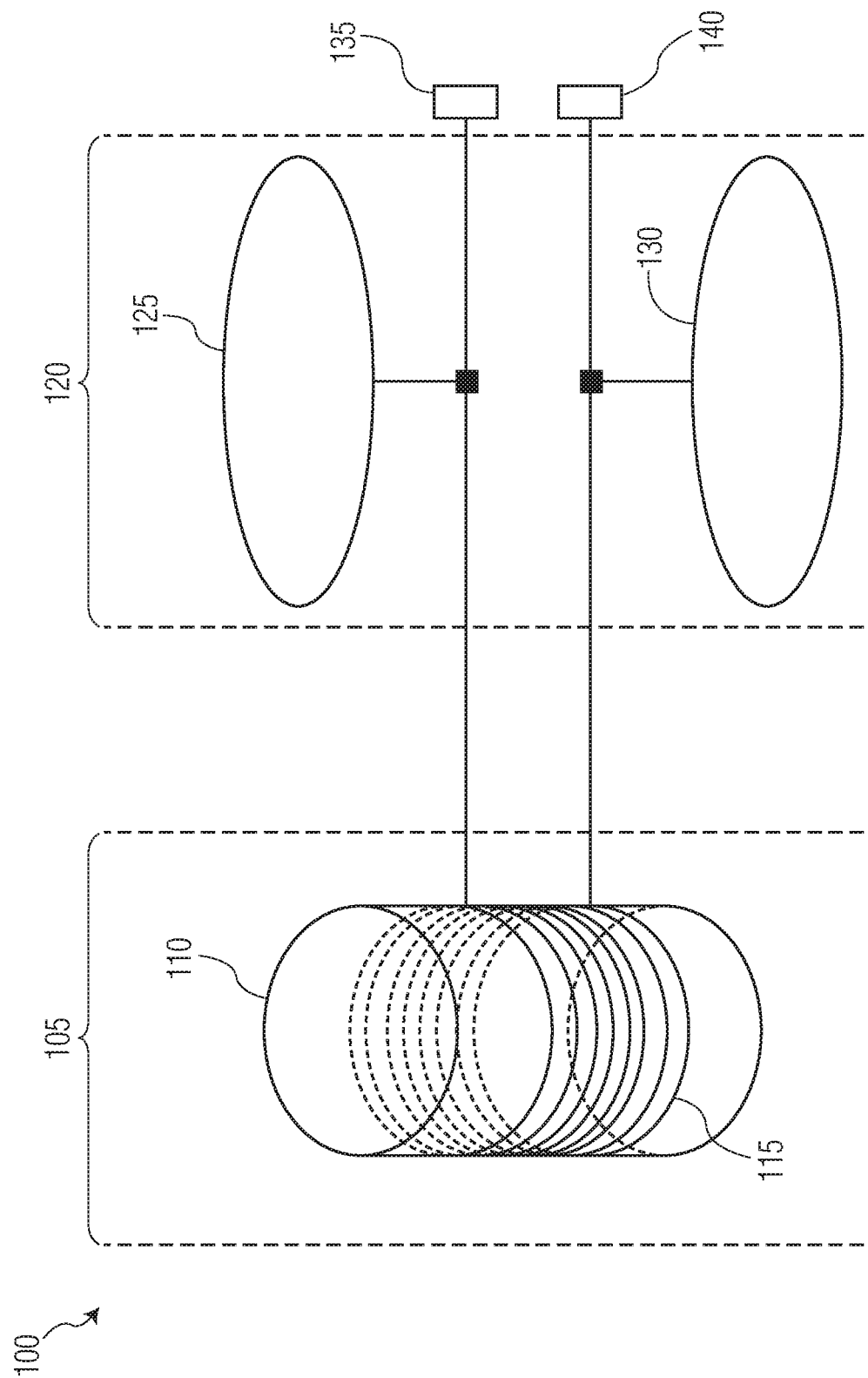
FIG. 1A is a first example near-field antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between one or more near-field devices on a user's body or the body of a conductive surface (i.e. on-body devices), and other conductive surfaces and/or other wireless devices (i.e. off-body devices) based on either near-field electromagnetic induction (NFEMI), where the transmitter and receiver are coupled by both magnetic (H) and electric (E) fields, near-field electric induction (NFEI), where the transmitter and receiver are coupled by electric (E) fields, and near-field magnetic induction (NFMI/NFC), where the transmitter and receiver are coupled by magnetic (H) fields. While RF wireless communication is accomplished by propagating an RF plane wave through free space, NFEMI, NFEI, NFMI and NFC communicates using non-propagating quasi-static E and/or H field signals.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the near-field device's carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the near-field device's carrier frequency and in some example embodiments has extra capacitance surfaces at both ends.

The quasi-static characteristic of these fields is a result of the near-field antenna's dimensions in combination with their carrier frequencies. Most of the near-field energy is stored in the form of magnetic and electric fields, while a small amount of RF energy inevitably propagates in free space. Small antenna geometries minimize radiating waves in free space.

Some near-field devices may employ Near-Field Magnetic Induction (NFMI, aka NFC) as a wireless communication method. In NFMI/NFC wireless communication, two loosely coupled coils realize signal transfer. No radiation of radio waves takes place. A current flowing in the transmission coil generates a H-field which in turn induces a current in the receiving coil. In this way, wireless communication is accomplished. H-field based NFMI systems with small antenna coils can have a limited range that may be much smaller than an entire wearable user's body.

Since magnetic near-fields are not coupled to a user's body, NFMI/NFC type communications can occur off-body (e.g. farther away from a user's body than near-field electric-induction signals). The magnetic near-field's communications range however is much shorter than a full user's body due to the near-field magnetic antenna's small size.

Some near-field devices employ Near-field Electric Induction (NFEI) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

Devices that employ both Near-Field Magnetic Induction and Near-field Electric Induction antennas are often called Near-Field Electromagnetic Induction (NFEMI) devices.

FIG. 1A is a first example near-field antenna 100. In this example the antenna 100 is a near-field electromagnetic induction (NFEMI) antenna. The antenna 100 includes a coil (H-field) antenna 105 for magnetic fields, in conjunction with a short loaded dipole (E-field) antenna 120 for electric fields. The H-field antenna 105 includes a ferrite core 110 wound with wire 115. The E-field antenna 120 includes two conductive loading structures 125 and 130. Antenna 100 feed-points 135, 140 are coupled to various transceiver circuitry, such as downstream radio transmitter and receiver integrated circuit (RF-IC), (not shown here).

When the NFEMI antenna 100 is proximate to a structure (e.g. a conductive structure, a body, a person, an object, etc.) the magnetic and electric fields will be substantially confined to the structure and not significantly radiate in free-space. This enhances security and privacy of such body networked communications.

In various example embodiments, the antenna 100 operates at or below 50 MHz (e.g. for example at 30 MHz) to ensure that the fields are following the structure's contours and to ensure that far field radiation is strongly reduced.

Figure 1B:
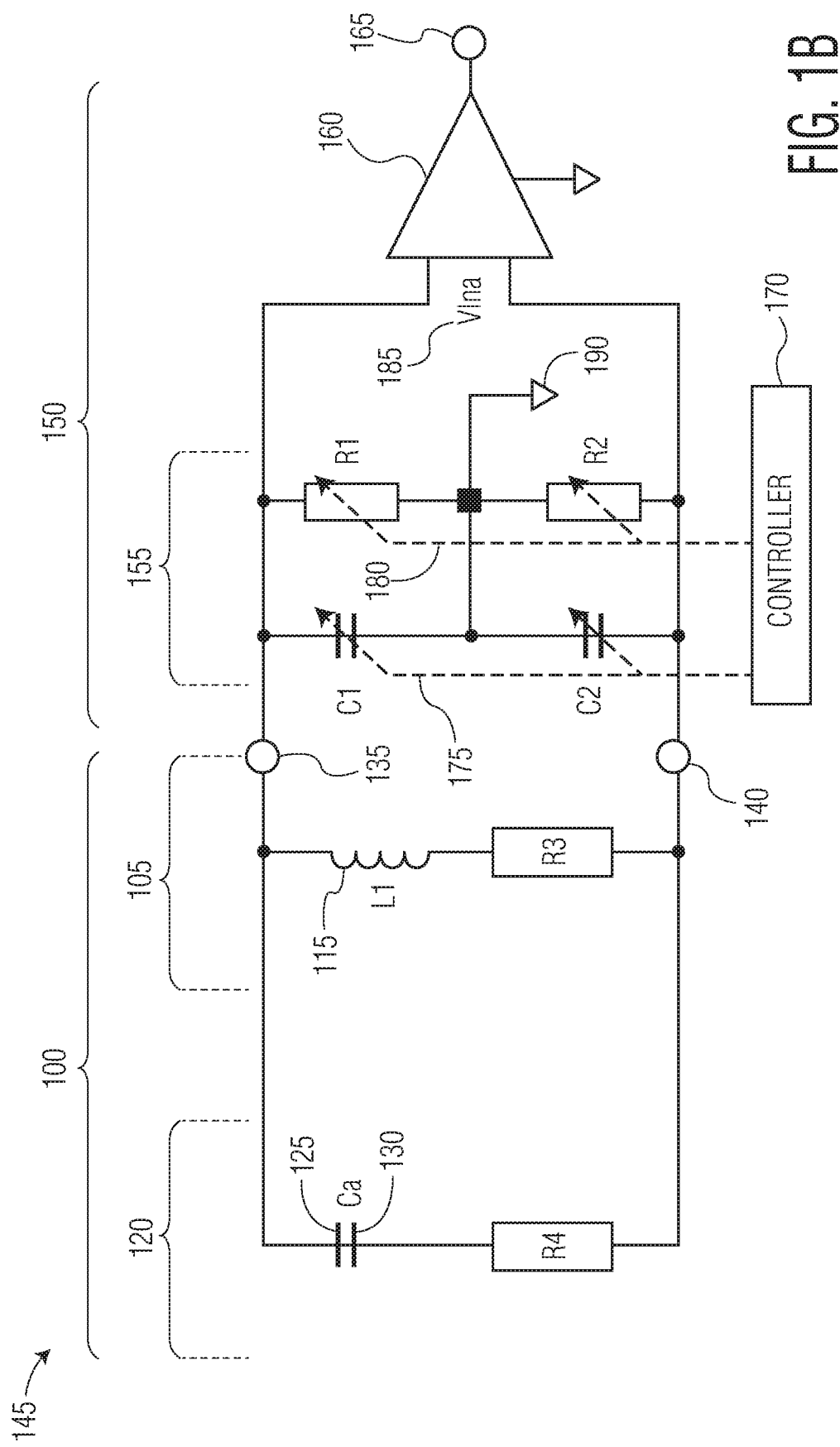
FIG. 1B is a first example near-field wireless device including the first example near-field antenna, supporting circuits, and configured to receive non-propagating quasi-static near-field signals.

FIG. 1B is a first example near-field wireless device 145 including the first example near-field antenna 100, supporting circuits 150, and configured to receive non-propagating quasi-static near-field signals. The near-field device 145 is configured to receive (e.g. in a receive mode) a non-propagating quasi-static near-field signal. Note that the near-field antenna 100 may also be coupled to a transmitter circuit (not shown) for two-way communications.

The example idealized antenna 100 includes the magnetic (H-field) antenna 105 having a resistance (R3) and an inductance (L1), the electric (E-field) antenna 120 having a conductive structure formed from the two loading surfaces 125 and 130, and the two feeding points 135, 140.

The supporting circuits 150 include a tuning circuit 155, an LNA 160 (low noise amplifier), a communications signal interface 165, and a controller 170.

The tuning circuit 155 is coupled to the first and second feed-points 135, 140. The tuning circuit 155 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 190 (e.g. a ground potential). The capacitive banks are coupled to the controller 170 by control line 175, and the resistance banks are coupled to the controller 170 by control line 180.

The controller 170 adjusts the first and second capacitance banks (C1), (C2) to adjust a resonant frequency of the magnetic 105 and the electric 120 antennas (e.g. to 10.6 MHz). The controller 170 adjusts the first and second resistance banks (R1), (R2) to adjust a bandwidth of the magnetic 105 and the electric 120 antennas (e.g. to 400 KHz) sufficient to allow the non-propagating quasi-static near-field signal to be received from the antennas 105, 120.

The capacitance banks (C1), (C2) are equally tuned using the control line 175 from the controller 170, and the resistance banks (R1), (R2) are equally tuned using the control line 180 from the controller 170.

The LNA 160 is coupled between the tuning circuit 155 and a communications signal interface 165. When the near-field device 145 is receiving the non-propagating quasi-static near-field signal, induced voltage 185 (Vlna) is present across the LNA 160 differential inputs. The LNA 160 amplifies the received near-field signal which is then further processed by additional radio/RFIC/baseband circuits (not shown) coupled to the communications signal interface 165. The LNA 160 is also coupled to the reference potential 190.

Since both inputs to the LNA 160 are coupled to the antennas 105, 120 the near-field device's 145 configuration is said to be balanced. The balanced circuit configuration helps reject interference signals that enter both LNA 160 input lines with the same amplitude and phase. In other examples an unbalanced device can be used.

During operation a voltage is induced in the electric (E-field) antenna 120 by a received near-field electric signal. This voltage generates a current through the E-field antenna 120.

Figure 2:
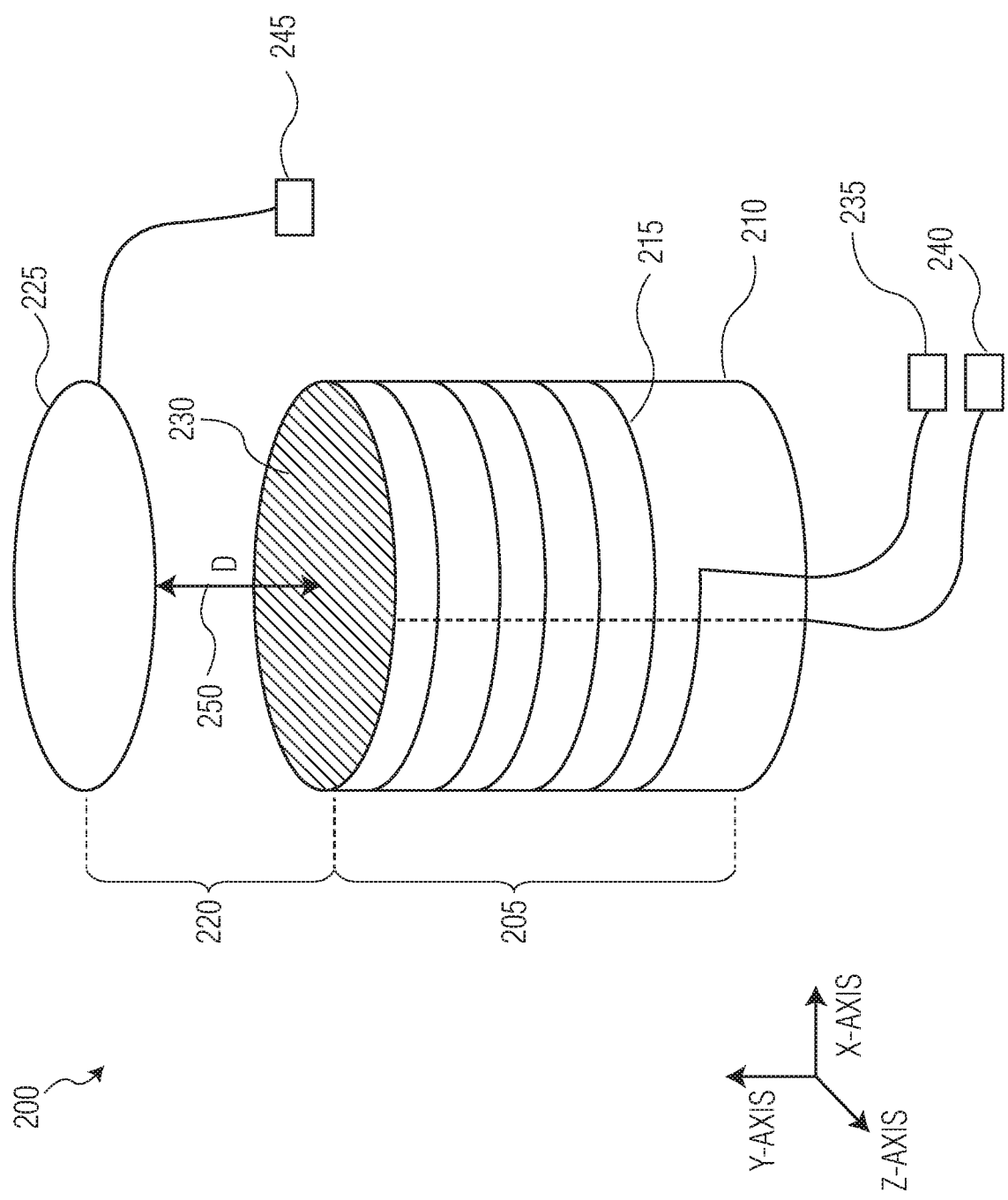
FIG. 2 is a second example near-field antenna.

FIG. 2 is a second example near-field antenna 200. In this example the antenna 200 is also a near-field electromagnetic induction (NFEMI) antenna. The antenna 200 includes a loop/coil (H-field) antenna 205 for magnetic fields, in conjunction with a short loaded dipole (E-field) antenna 220 for electric fields.

The H-field antenna 205 includes a ferrite core 210 wound with a helical wire 215. The core 210 may have a permeability greater than air, for example of 150. With such a permeability, fewer windings are required to achieve a same inductance as an air core.

The E-field antenna 220 includes two conductive loading surfaces 225 and 230. In some example embodiments, the second conductive loading surface 230 is formed from the coil's 205 wires 215. In other example embodiments, the second conductive loading surface 230 is an actual second conductive surface attached to the coil antenna 205. The conductive surfaces 225, 230 are separated from each other by a distance (D) 250.

In some example embodiments, the distance 250 is filled with a substrate material, such as air, or another material having a permittivity larger than air, for example a permittivity of 4.

Antenna 200 feed-points 235, 240, 245 are coupled to various transceiver circuitry (see FIG. 3), such as a downstream radio transmitter and receiver integrated circuit (RF-IC).

The antenna 200 can be tuned to resonate at a communication frequency by means of reactance components that are integrated in the RF-IC. The antenna's 200 bandwidth can similarly be tuned using the reactance components.

When the NFEMI antenna 200 is proximate to a conductive structure (e.g. on-body) the magnetic and electric fields will be substantially confined to the conductive structure and not significantly radiate in free-space. This enhances security and privacy of such on-body networked communications.

In various example embodiments, the antenna 200 operates at or below 50 MHz (e.g. for example at 30 MHz) to ensure that the fields are following the conductive surface's contours and to ensure that far field radiation is strongly reduced.

Figure 3:
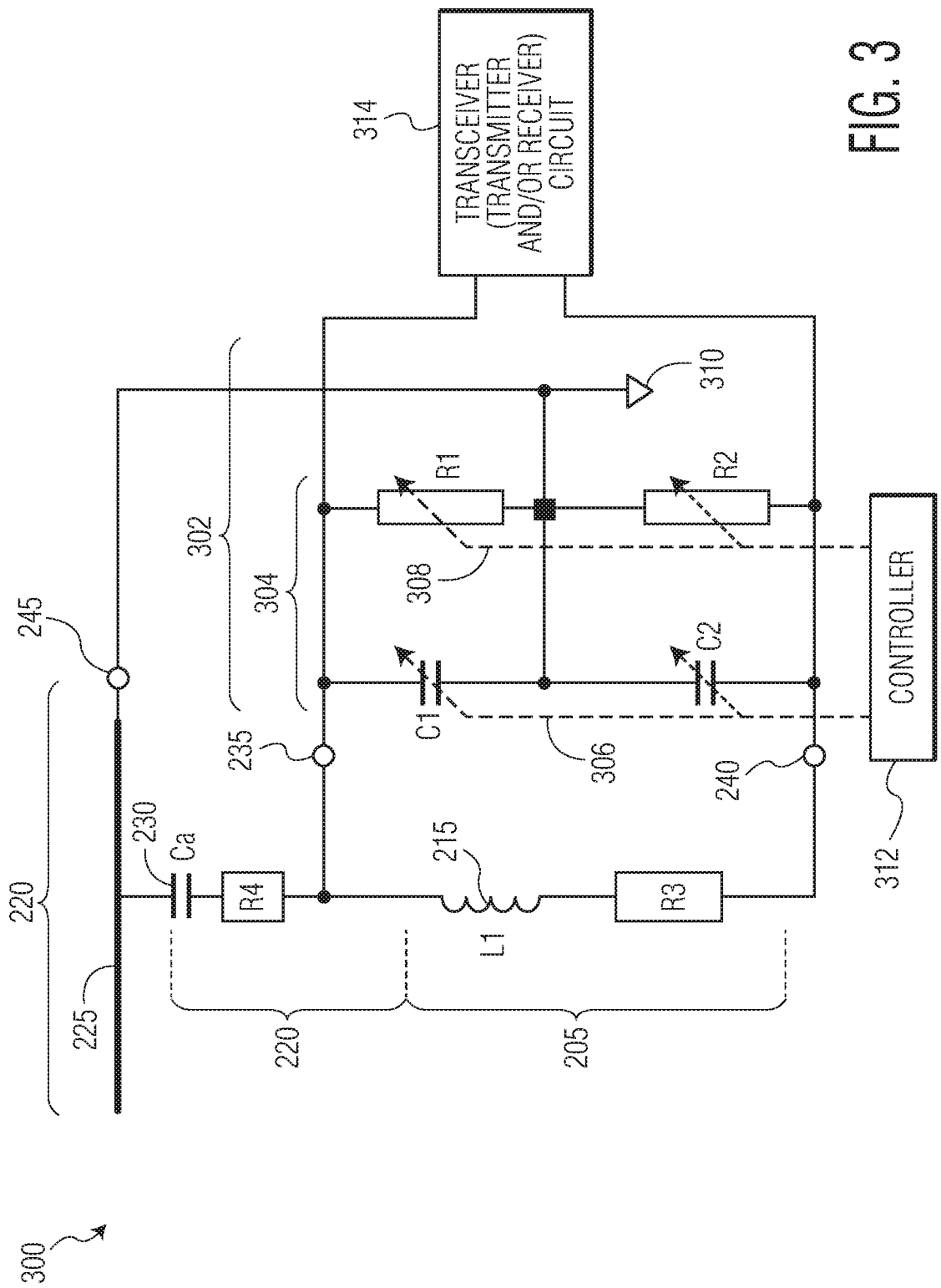
FIG. 3 is a second example near-field wireless device including the second example near-field antenna, supporting circuits, and configured to receive or transmit non-propagating quasi-static near-field signals.

FIG. 3 is a second example near-field wireless device 300 including the second example near-field antenna 200, supporting circuits, and configured to receive or transmit non-propagating quasi-static near-field signals.

The example circuit 300 includes the second example near-field antenna 200, supporting circuits 302, transceiver circuit 314, and is configured to communicate (i.e. transmit and/or receive) using non-propagating quasi-static near-field signals.

The idealized second example near-field antenna 200 includes the magnetic (H-field) antenna 205 having a resistance (R3) and an inductance (L1), the electric (E-field) antenna 220 having a conductive structure formed from the two loading surfaces 225 and 230, and the three feeding points 235, 240, 245. The supporting circuits 302 include a tuning circuit 304 and the controller 312.

A capacitance (Ca) between the two loading surfaces 225 and 230 is a function of its effective size and the distance (D) 250 of the conductive surface 225 to the windings 215 of the magnetic antenna 205. The windings 215 electrically form the conductive surface 230.

The tuning circuit 304 is coupled to the three feed-points 235, 240, 245. The tuning circuit 304 includes a first variable tuning capacitance bank (C1), a second variable tuning capacitance bank (C2), a first variable tuning resistance bank (R1), and a second variable tuning resistance bank (R2).

The capacitance banks and resistance banks are coupled to a mid-point 310. In some example embodiments, the mid-point 310 is a voltage reference potential. In other example embodiments, the mid-point 310 is a ground potential.

The mid-point 310 is coupled to the conductive surface 225 via the feed-point 245. Such coupling expands an effective size of the conductive surface 225, resulting in a higher E-field antenna 220 signal gain.

In some example embodiments, the mid-point 310 is non-galvanically coupled to the conductive surface 225. In still other example embodiments, the mid-point 310 is galvanically directly connected to the conductive surface 225.

In some example embodiments, the mid-point 310 is coupled to the wireless 300 device's reference plane, thereby further expanding the effective size of the conductive surface 225, resulting in an even higher E-field antenna 220 signal gain.

The capacitive banks are coupled to the controller 312 by control line 306, and the resistance banks are coupled to the controller 312 by control line 308.

The controller 312 adjusts the first and second capacitance banks (C1), (C2) to adjust a resonant frequency of the magnetic 205 and the electric 220 antennas (e.g. to 10.6 MHz). The controller 312 adjusts the first and second resistance banks (R1), (R2) to adjust a bandwidth of the magnetic 205 and the electric 220 antennas (e.g. to 400 KHz) sufficient to allow the non-propagating quasi-static near-field signal to be received from the antennas 205, 220.

In some example embodiments, the capacitance banks (C1), (C2) are equally tuned using the control line 306 from the controller 312, and the resistance banks (R1), (R2) are equally tuned using the control line 308 from the controller 312.

In some example embodiments, communications signal measurements have shown a 7 to 8 dB link budget increase using the second example near-field antenna 200 instead of the first example near-field antenna 100. Link Budget=VTx−VRx, where VTx is a transmitter voltage across a transmitting near-field antenna in dBuV and VRx is a received voltage in dBuV at an input of a low noise amplifier in the transceiver circuit 314.

The transceiver circuit 314 can be configured for either balanced or unbalanced operation.

Figure 4:
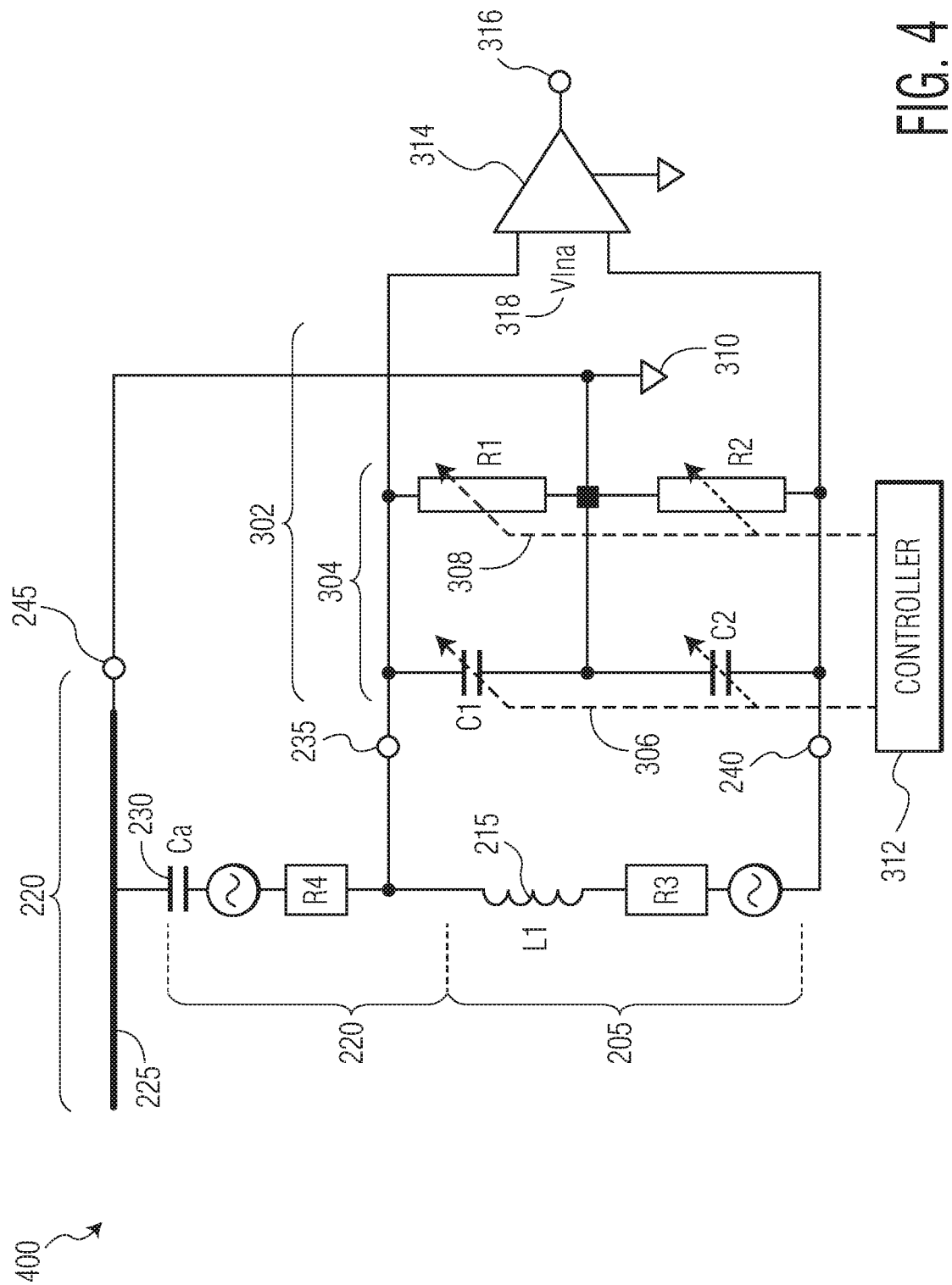
FIG. 4 is the second example near-field wireless device in a receive mode.

FIG. 4 is the second example near-field wireless device 300 in a receive mode 400. In the receive mode 400, a receiver (e.g. LNA) portion of the transceiver circuit 314 is explicitly shown. A communications signal interface 316 output from the LNA receiver portion is also shown along with an induced voltage (Vlna) 318 at input to the receiver LNA.

When the wireless device 300 is close to the body (e.g. on-body) and a second near-field device is generating near-field electric and magnetic fields a first voltage will be induced into the magnetic antenna 205 and a second voltage will be induced in series with the capacitance in the short loaded dipole (E-field) antenna 220, which is in parallel configuration with the magnetic antenna 205. The first voltage will be induced by the received magnetic (H) near-field and the second voltage will be induced by the received electric (E) near-field.

Figure 5:
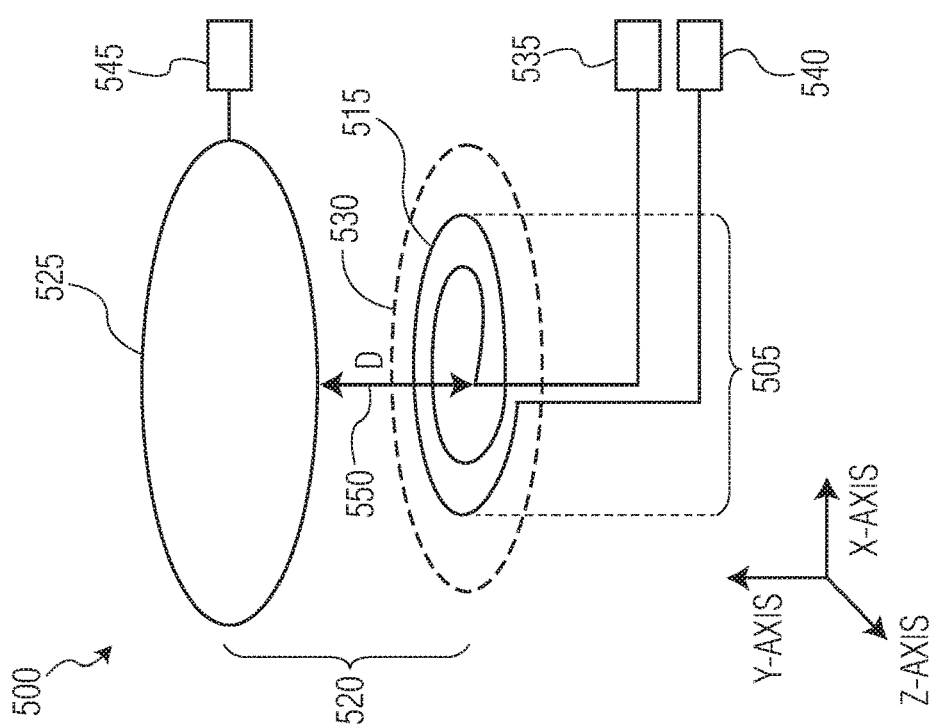
FIG. 5 is a third example near-field antenna.

FIG. 5 is a third example 500 near-field antenna. In this example the antenna 500 is also a near-field electromagnetic induction (NFEMI) antenna. The antenna 500 includes a loop/coil (H-field) antenna 505 for magnetic fields, in conjunction with a short loaded dipole (E-field) antenna 520 for electric fields. The H-field antenna 505 includes a planar spiral wire 515.

The E-field antenna 520 includes two conductive loading surfaces 525 and 530. The second conductive loading surface 530 is formed from the coil's 505 wires 515. The conductive surfaces 525, 530 are separated from each other by a distance (D) 550.

Antenna 500 feed-points 535, 540, 545 are coupled to various transceiver circuitry (see FIG. 3), such as a downstream radio transmitter and receiver integrated circuit (RF-IC).

Figure 6:
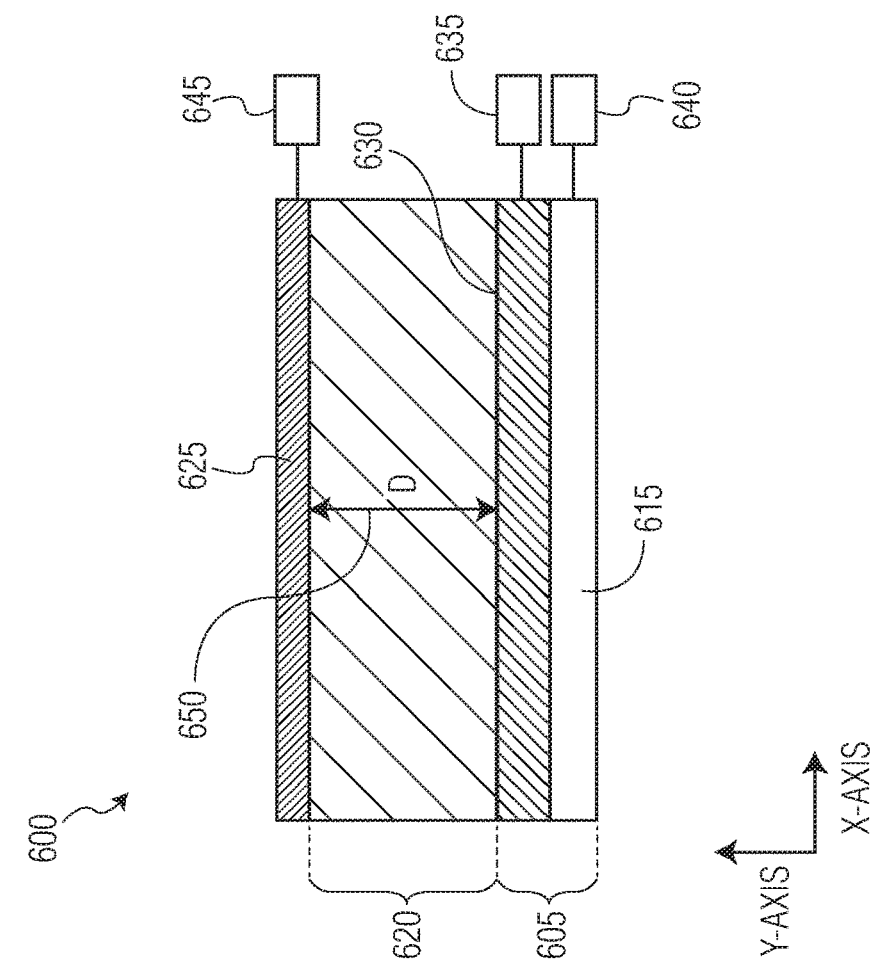
FIG. 6 is a fourth example near-field antenna.

FIG. 6 is a fourth example 600 near-field antenna. In this example the antenna 600 is also a near-field electromagnetic induction (NFEMI) antenna, but is now in a multi-layer structure. The antenna 600 includes a planar spiral coil (H-field) antenna 605 with a ferrite sheet for magnetic near-field signal communications, in conjunction with a short loaded dipole (E-field) antenna 620 for electric fields. The H-field antenna 605 includes a spiral wire 615.

The E-field antenna 620 includes two conductive loading surfaces 625 and 630. The second conductive loading surface 630 is formed from the coil's 605 wires 615. The conductive surfaces 625, 630 are separated from each other by a distance (D) 650. This distance (D) 650 can be filled with a substrate material which can be air, but can also have a permittivity larger than air (e.g. a permittivity of 4).

This fourth example 600 near-field antenna structure may also include a layer of electronic components and conductive traces for various wireless device 300 functions.

Antenna 600 feed-points 635, 640, 645 are coupled to various transceiver circuitry (see FIG. 3), such as a downstream radio transmitter and receiver integrated circuit (RF-IC).

In various applications, the near-field wireless device 300 can be embedded in various wearables for wireless on-body networks that require a small form factor. Medical applications, for example glucose monitoring system that is worn on-body are also possible. A measured glucose level in the user's blood can be near-field wirelessly communicated using on-body communication to an insulin pump worn by the user and having embedded a second near-field wireless device. A third near-field wireless device (e.g. in a smartphone, using NFC), can optionally energize either of the near-field devices and read back the measured glucose data for further medical support.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field wireless device, comprising:
   a coil, including a first feed-point and a second feed-point, and configured to carry non-propagating quasi-static near-field magnetic-induction wireless signals;

a conductive surface, including a third feed-point, and configured to carry non-propagating quasi-static near-field electric-induction wireless signals;

a tuning circuit including a first tuning element, a second tuning element, and a mid-point;

wherein a first end of the first tuning element is coupled to the first feed-point;

wherein a first end of the second tuning element is coupled to the second feed-point;

wherein a second end of the first tuning element and a second end of the second tuning element are coupled to the mid-point; and wherein the third feed-point is coupled to the mid-point.

2. The device of claim 1:
wherein the mid-point is directly connected to a voltage reference wholly within the device.

3. The device of claim 1:
wherein the mid-point is directly connected to a ground plane wholly within the device.

4. The device of claim 1:
wherein the conductive surface is coupled to a ground plane with an electrical wire.

5. The device of claim 1:
wherein the conductive surface is coupled to the mid-point with an electrical wire.

6. The device of claim 1:
further comprising a reference plane;
wherein the mid-point is coupled to the reference plane; and
wherein the reference plane is configured to increase an effective electrical size of the conductive surface responsive to the near-field electric-induction wireless signals.

7. The device of claim 1:
wherein either the first or second first tuning element is a capacitance tuning element.

8. The device of claim 1:
wherein either the first or second first tuning element is a resistive tuning element.

9. The device of claim 1:
wherein the conductive surface is configured to be placed within a first distance from the coil and a second distance from a user's body.

10. The device of claim 9:
wherein the second distance is greater than the first distance.

11. The device of claim 1:
wherein the conductive surface is a first conductive surface;
wherein the coil is configured as a second conductive surface; and
wherein the first and second conductive surfaces are configured to carry the near-field electric-induction wireless signals.

12. The device of claim 1:
wherein the conductive surface is a first conductive surface;
further comprising a second conductive surface coupled to either the first feed-point or the second feed-point; and
wherein the first and second conductive surfaces are configured to carry the near-field electric-induction wireless signals.

13. The device of claim 1:
wherein the coil includes a planar coil having a spiral wound wire.

14. The device of claim 1:
wherein the coil includes a core having a helically wound wire around the core.

15. The device of claim 1:
wherein the conductive surface is configured for on-body near-field communications.

16. The device of claim 1:
wherein the first and second tuning elements are resistive elements, configured to vary a bandwidth of the wireless device.

17. The device of claim 1:
wherein the first and second tuning elements are capacitive elements, configured to vary a resonant frequency of the wireless device.

18. The device of claim 1:
wherein the electric-induction near-field signals are hosted by a user's body; and
wherein the user's body is at least one of: a human body, a vehicle body, a robot, a docking device, a physical coupling system, or a tool or storage station on an assembly line.

19. The device of claim 1:
wherein the wireless device is embedded in at least one of: a wearable, a glucose monitor, a medical device, a smart watch, an earbud, a hearing aid, a headphone, an activity tracker, or a heart rate monitor.

20. The device of claim 1:
wherein the third feed-point is fixedly attached to the mid-point.

* * * * *